Feb. 23, 1965     E. C. DENNE, JR     3,170,737
EXPANSION MOUNTING
Filed March 28, 1962     2 Sheets-Sheet 1
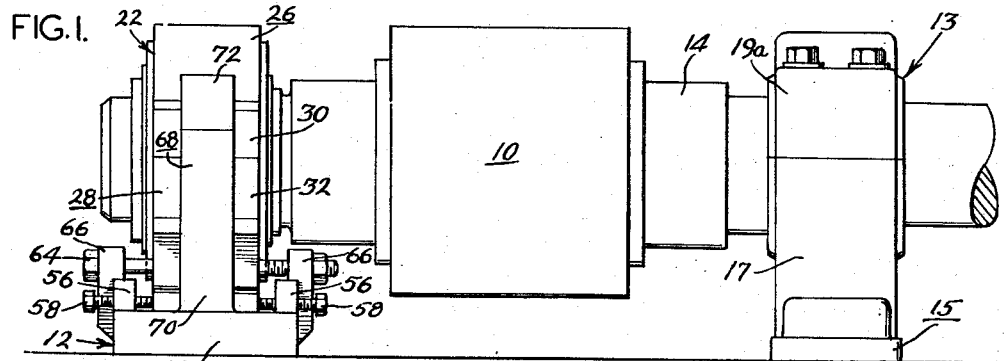
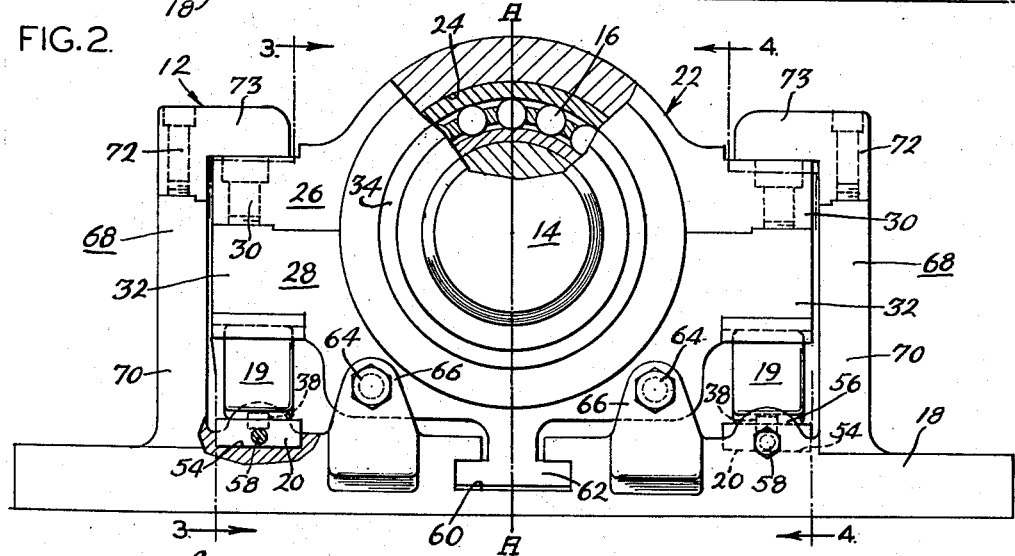
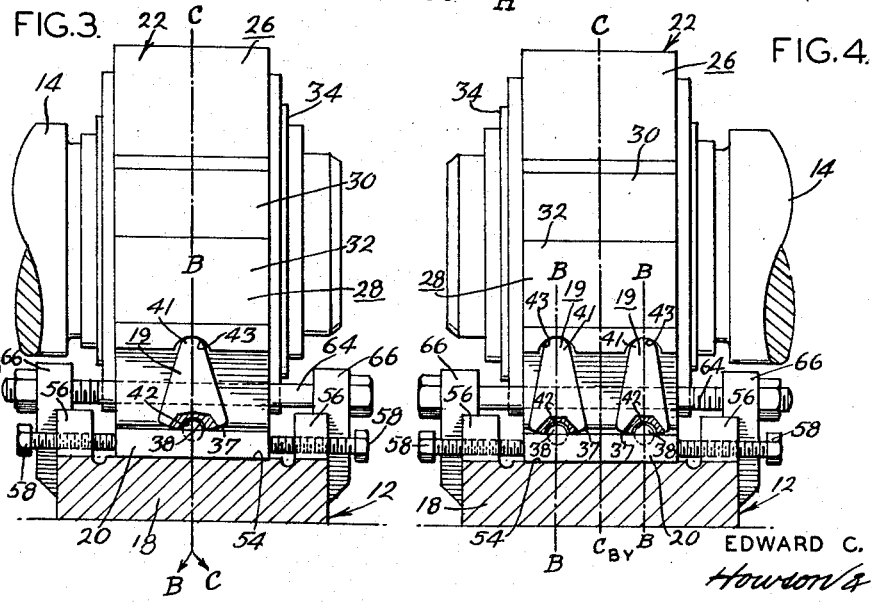
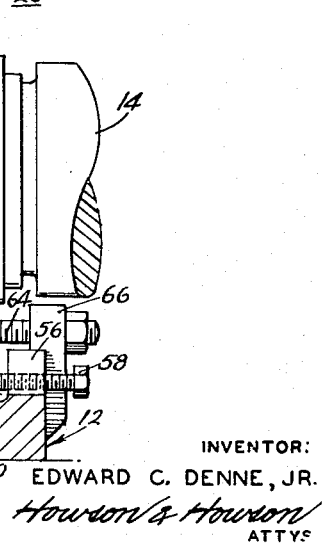
INVENTOR:
EDWARD C. DENNE, JR.
Howson & Howson
ATTYS Feb. 23, 1965  E. C. DENNE, JR  3,170,737
EXPANSION MOUNTING
Filed March 28, 1962
2 Sheets-Sheet 2

INVENTOR:
EDWARD C. DENNE, JR.
BY Howdon & Howdon
ATTYS.

United States Patent Office 3,170,737
Patented Feb. 23, 1965

3,170,737
EXPANSION MOUNTING
Edward C. Denne, Jr., Glenside, Pa., assignor to SKF Industries, Inc., Philadelphia, Pa., a corporation of Delaware
Filed Mar. 28, 1962, Ser. No. 183,135
5 Claims. (Cl. 308—59)

The present invention relates to expansion mountings and the like and more particularly to an improved expansion mounting having novel features of construction and arrangement whereby the assembly, handling and installation thereof are greatly facilitated.

Expansion mountings of the above type have application in arrangements of the type illustrated, for example, in FIG. 1 including a shaft journalled at each end in a conventional bearing and supporting along its length between the bearings a cylindrical member such as the dryer of a paper machine wherein one of the bearings is supported in an expansion mounting and the other bearing is supported in a conventional pillow block or the like. Prior expansion mountings comprise a base, a bearing housing overlying the base and rockers mounted on the base to support the bearing housing. The rockers are adapted for rolling movement on the base to permit fore and aft movement of the bearing housing relative to the base to allow for normal expansion and contraction of the shaft and dryer. Heretofore in installing a dryer assembly, the base members of the expansion mounting and pillow block are located in an approximate spaced relation with respect to one another and the rockers are positioned on the base member of the expansion mounting in position to support the bearing housing in predetermined spaced relation with respect to the pillow block to receive the shaft and dryer. However, in order to align and space the bearing housings accurately to receive the bearings on the shaft, it is usually necessary to adjust the position of the bearing housings relative to one another by relocating the rockers supporting the bearing housing of the expansion mounting.

Since the elements of above installation are comparatively heavy and bulky, it is readily apparent that accurate alignment of the bearing housings in the manner described above is tedious and time consuming. Further there existed the possibility of the rockers slipping with respect to the base as a result of normal expansion and contraction of the shaft and dryer over a period of normal use. Accordingly if it becomes necessary to disassemble the expansion mounting, for example, to replace parts such as the bearing assemblies, it is also necessary to realign the housing with respect to the base by adjusting the position of one or more of the rockers.

The present invention provides an improved expansion mounting having novel features of construction and arrangement whereby the assembly, handling and installation thereof are much easier and less time consuming than prior expansion mountings described above. In accordance with the present invention the rockers are mounted on a pad on the base and key means is provided to anchor the rockers to the pad to prevent sliding movement of the rockers on the pad. The pad is movable selectively in a fore and aft direction with respect to the base to provide means for adjusting the bearing housing relative to the base. By this arrangement the base, bearing housing and rockers of the expansion mounting may assembled prior to use thereof in the dryer installation described above and may be adjusted accurately and quickly by the pad to support the shaft in the desired position.

It is noted that since the rockers are keyed to the pad, individual adjustment thereof is obviated and that the key means prevents slipping of the rockers and positively locates the rockers on the pads whereby the expansion mounting may be disassembled as often as necessary without requiring readjustment. Additionally in accordance with the present invention means is provided to maintain the base, bearing housing and rockers as an integral unit thereby facilitating handling, shipping and installation thereof whereas prior expansion mountings comprised separate, unintegrated elements which were more difficulet to handle, ship and install.

With the foregoing in mind, an object of the present invention is to provide an improved expansion mounting which is of extremely simple design and which is fully effective in operation and use.

A further object of the present invention is to provide an expansion mounting wherein the elements thereof form an integral unit to facilitate handling and shipping thereof and provide for easy installation of the expansion mounting.

All of the objects of the present invention and the details of the construction and operation thereof are set forth more fully hereinafter with reference to the accompanying drawing, wherein;

FIG. 1 is a schematic illustration of an expansion mounting constructed in accordance with the present invention and a conventional pillow block or the like supporting therebetween a rotatable member such as the cylindrical dryer of a paper machine or the like;

FIG. 2 is a side elevational view of an expansion mounting in accordance with the present invention with parts broken away to show structural details thereof;

Figure 5:
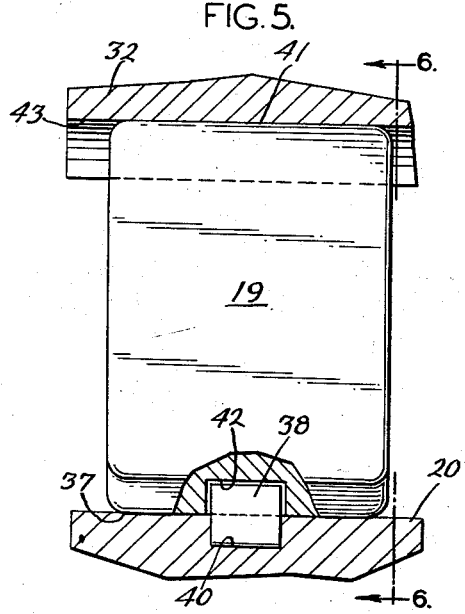
Figure 6:
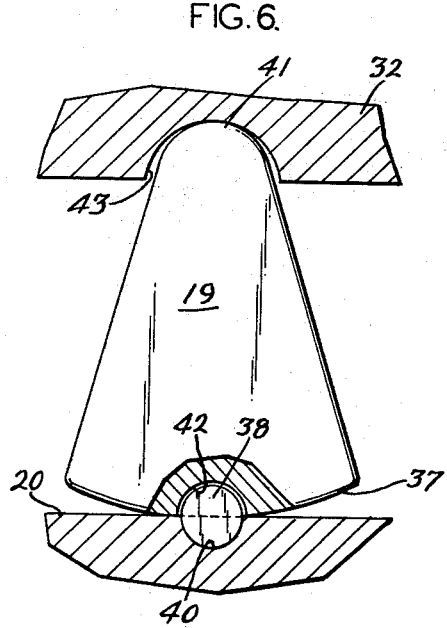
Figure 7:
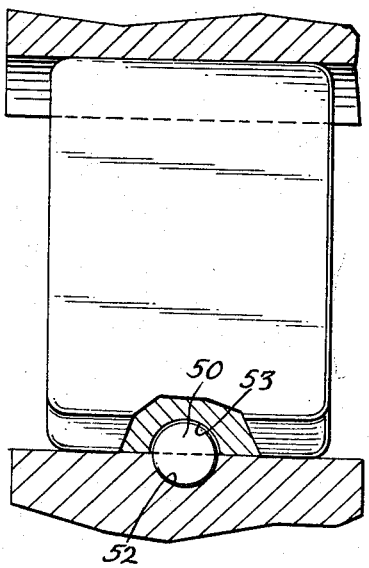

FIGS. 3 and 4 are enlarged sectional views taken on lines 3—3 and 4—4 respectively of FIG. 2;

FIG. 5 is an enlarged fragmentary side elevational view of one of the rockers and one embodiment of key means in accordance with the present invention for anchoring the rocker to the support portion of the base with parts broken away to show structural details thereof;

FIG. 6 is a sectional view of the rockers of FIG. 5 taken on line 6—6 of FIG. 5 with parts broken away to show structural details thereof; and FIG. 7 is an enlarged fragmentary view similar to FIG. 5 showing another embodiment of key means in accordance with the present invention.

Referring now to the drawings, FIG. 1 shows a typical arrangement for rotatably supporting a cylindrical member 10 such as the dryer of a paper machine or the like between an expansion mounting 12 constructed in accordance with the present invention and a conventional pillow block 13 or the like. As illustrated, the pillow block 13 includes a base, 15, a lower bearing housing section 17 formed integrally with the base and an upper bearing housing section 19a detachably secured to the lower bearing housing section 17 by means of suitable fasteners. As illustrated, the dryer 10 is mounted on a shaft 14 which is journalled at each end in a conventional bearing 16. One of the bearings 16 is supported in the expansion mounting 12 and the other is supported in the pillow block 13. Suitable drive means, for example, gearing from a motor or drive pulley (not shown) may be connected to one end of the shaft 14 to drive the same. While a specific application of an expansion mounting in accordance with the present invention is illustrated, it is of course to be understood that there are many other useful applications for the same.

Considering now the expansion mounting, the structural details thereof are shown for example, in FIG. 2. As shown therein, each expansion mounting comprises a base 18, a bearing housing 22 overlying the base 18, support means in the present instance rockers 19 supporting the bearing housing 22 above the base and adapted for rolling movement to permit fore and aft movement of the bearing housing relative to the base. The bearing housing 22 has a cylindrical opening 24 therethrough to receive and support the bearing 16. In the present instance the housing 22 is a split housing consisting of upper and lower yoke-like, semi-circular collars 26 and 28 respectively which are secured together by suitable fasteners which engage through lateral extensions 30 and 32 of the collars 26 and 28 respectively. A ring-like retainer 34 is provided at each axial end of the opening 24 to restrict axial movement of the bearing 16 with respect to the bearing housing 22.

In the expansion mounting illustrated, two rockers 19 are disposed between the bearing housing 22 and base 18 at one side of a plane A—A aligned with the central axis of the opening 24 through the center of the bearing housing 22 and a single rocker 19 is disposed between the bearing housing 22 and base 18 at the opposite side of the plane A—A. By this arrangement of rockers a three-point support is provided for the bearing housing. Each rocker 19 is of pie-shaped configuration having an arcuate seat 37 and a rounded apex 41 which engages in a laterally extending groove 43 in the lateral extensions 32 of the collar 28.

In accordance with the present invention, the base includes a support portion for the rockers, in the present instance in the form of support pads 20 and key means is provided to anchor each rocker in a predetermined position relative to its respective support pad and prevent sliding movement of the rocker relative to the support pad. The key means shown in FIGS. 5 and 6 comprises a keying element in the form of a short cylindrical roller 38 which seats in a laterally extending semi-cylindrical recess 40 in the pad 20. As illustrated, the roller 38 projects upwardly beyond the top surface of the pad 20 to engage in a semi-cylindrical pocket 42 in the arcuate seat 37 of the rocker 36. It is noted that the pocket 42 is disposed approximately centrally of the arcuate seat 37 and that there is a slight clearance between the exposed peripheral surface of the roller 38 and the pocket 42 whereby the roller 38 serves to anchor the rocker 19 with respect to the pad 20 but does not support the weight thereof. In the present instance, the recesses 40 in the pad 20 at the right of the plane A—A with respect to FIG. 2 are spaced apart a distance approximately equal to the spacing between the grooves 43 in the lower collar 28 whereby the rockers 19 are disposed in an upright vertical position in the relaxed position of the expansion mounting (see FIG. 4). In this position, the plane B—B bisecting each of the rockers 19 transversely (see FIGS. 3 and 4) is parallel to a plane C—C normal to the central axis of the opening 24 and bisecting the bearing housing 22. Further as illustrated, the rockers 19 at the right-hand side of the plane A—A are disposed on opposite sides of the plane C—C and equispaced therefrom and the rockers 19 at the left-hand side of plane A—A is aligned with the plane C—C. By this arrangement the bearing housing is firmly supported on the support pads and the rockers may be easily and quickly positioned on the base in predetermined positions relative to each other to support the bearing housing without having to adjust the individual rockers.

In accordance with the present invention the support pads are movable in a fore and aft direction relative to the base to provide easy and quick means for moving the bearing housing in a predetermined direction relative to the base. To this end a trackway in the form of a channel 54 is provided in the base for each pad 20 and as illustrated, the channels 54 extend in a fore and aft direction relative to the base on opposite sides of the plane A—A. An upstanding ear 56 projects upwardly from the base at each end of the channels thereby to limit fore and aft movement of each pad 20 in its respective channel 54, each pad being shorter in length than the length of the channel 54. As illustrated, an adjusting screw 58 is threaded in each of the ears and abuts an end face of the pad 20 whereby each pad may be adjusted selectively in a fore and aft direction relative to the base by manipulation of the screws 58. By this arrangement the rockers may be assembled in fixed positions relative to the support pads to support the bearing housing in a fixed position relative to the pads 20 and through the adjusting screws 58, the bearing housing may be moved relative to the base to facilitate installation of the expansion mounting as described in more detail hereinafter.

Another form of key means in accordance with the present invention is illustrated in FIG. 7. In accordance with this embodiment of the invention the keying element is in the form of a sphere or ball 50 which seats in a semi-circular recess 52 in the pad and projects upwardly from the top surface of the pad to engage in a semi-spherical pocket 53 in the arcuate seat of the rocker.

In accordance with this embodiment of the invention, the recesses 52 are located to support the rockers in the same position relative to one another and to the bearing housing as described previously and as illustrated in FIGS. 3 and 4. Further it is noted that there is a clearance between the ball 50 and the pockets 53 in the rocker seat whereby the sphere locates or anchors the rocker with respect to the pad but does not support the weight thereof.

In accordance with another feature of the invention, means is provided to maintain the bearing housing, base and rockers as an integral unit to facilitate shipping, handling and installation of the expansion mounting. To this end, the bearing housing 22 is connected to the base 18 by a dovetail joint consisting of an inverted T-shaped slot 60 in the base and a complementary inverted T-shaped projection 62 depending from the lower collar 28 which engages in the T-slot 60. In lieu of the dovetail joint, a pair of suitable fasteners 64 may be provided which are threaded at their outer ends and which engage through openings in the lower housing section and each is supported at its outer ends in confronting lugs 66 projecting upwardly from the base. Another arrangement for maintaining the bearing housing, base and rockers as an integral unit consists in the provision of an upstanding clamping member 68 disposed at each end of the housing which as illustrated, consists of a lower portion 70 formed integrally with the base and an inverted L-shaped upper portion 72 detachably secured to the lower section by suitable fasteners. As illustrated, the leg 73 of the upper portion overlies the lateral extension of the collar 26 in the assembled position shown in FIG. 2. By any of these arrangements it is apparent that the bearing housing, base and rockers are maintained as an integral unit while the bearing housing is permitted freedom of movement in a fore and aft direction to compensate for expansion and contraction of the shaft and dryer.

Considering now the procedure for installing an arrangement as shown in FIG. 1 and the advantages of employing expansion mountings in accordance with the present invention, expansion mountings in accordance with the present invention may be completely assembled prior to transportation to the intended site of installation in the manner noted above thereby facilitating handling and shipping thereof. At the installation site, the expansion mounting and pillow block 13 are located in predetermined spaced apart relation with the opening 24 in the bearing housing and the opening in the pillow block 13 in accurate axial alignment to receive the shaft and dryer assembly. Accurate alignment of the expansion mounting is assured in accordance with the present invention by reason of the fact that the rockers are keyed to the support pads thereby anchoring the bearing housing in a fixed position relative thereto. Thereafter the upper portions 72 of the clamping members and the upper collar 26 of the expansion mounting are removed so that the bearing 16 at one end of the shaft may be positioned in the lower collar 28 and the upper bearing housing section 19a of the pillow block 13 is removed so that the bearing at the other end of the shaft may be positioned in the lower bearing housing section 19a. It is noted that the key means prevents displacement of the rockers relative to the pads during positioning of the shaft and dryer in place in the collar 28. Further the adjusting screws 58 provide an easy and accurate means for moving the lower housing section slightly to align it very accurately to receive the shaft 14. After the shaft and dryer are in place, the upper collar 26 of the expansion mounting is secured in place, and the upper portion 72 of the clamping members are secured to their respective lower sections 70.

Further the upper bearing housing section 19 of the pillow block 13 is assembled to the lower bearing housing section 17. As noted above, the assembled expansion mounting permits fore and aft movement of the bearing housing to compensate for contraction and expansion of the shaft and dryer assembly. Further it is noted that the key means prevents slipping of the rockers as a result of normal expanding and contracting movement of the dryer assembly so that if it is necessary to disassemble the expansion mountings to replace for example, parts of the bearing assembly, the key means insures that the bearing housings are maintained in a predetermined fixed relation thereby facilitating reassembly of the dryer and shaft.

Key means of the present invention operates to positively located the rockers on the pads without interfering with the normal rolling movement of the arcuate surface 37 on the upper surface of the pad. The key means eliminates any sliding movement which might otherwise cause wear and disturb the accurate alignment of the bearings.

From the foregoing it may be seen that the present invention provides an improved expansion mounting providing for easy assembly of the elements of the expansion mounting and easy, quick and accurate installation thereof in an arrangement of the type illustrated in FIG. 1.

While particular embodiments of the present invention have been illustrated and described herein, it is not intended to limit the invention and changes and modifications may be made therein within the scope of the following claims.

I claim:

1. In an expansion mounting, a base, a housing for rotatably mounting a shaft overlying said base, a pad providing a support portion mounted on said base, at least one rocker mounted on said support portion of said pad and supporting said housing, said rocker including a seat having a surface confronting and engaging a surface of said support portion, only one of said surfaces being arcuate to permit limited rolling movement of the rocker with respect to said support portion to afford movement of said housing relative to said pad, means defining a recess in said support portion, means defining a pocket in said seat, a keying element seated in said recess having a portion projecting from said recess beyond said support portion adapted to engage in said pocket to prevent sliding movement of said rocker with respect to said support portion, said projecting portion of the keying element spaced from said pocket whereby the weight of said rocker is supported on said pad, means mounting said pad for sliding movement on said base in a direction parallel to the rotational axis of the shaft whereby the relative position of said housing and base may be varied selectively, and means maintaining said base, housing, rocker, keying element and pad as an integral unit.

2. In an expansion mounting as claimed in claim 1 wherein said recess and said pocket are semi-cylindrical and said keying element comprises a cylindrical roller element seated in said recess and projecting upwardly therefrom to engage in said pocket.

3. In an expansion mounting as claimed in claim 1 wherein said recess and said pocket are semi-spherical and said keying element comprises a spherical roller element seated in said recess and projecting upwardly therefrom to engage in said pocket.

4. An expansion mounting as claimed in claim 1 including a trackway in said base for said pad and a pair of ears projecting from said base at opposite ends of said trackway and screw means in each of said ears operable to engage said pad to actuate it in said trackway.

5. An expansion mounting as claimed in claim 1 including an inverted T-shaped slot in said base and a dovetail extension depending from said housing engaging in said T-shaped slot whereby said housing may be moved relative to said base in a direction parallel to the shaft.

References Cited in the file of this patent

UNITED STATES PATENTS

| | | |
|---|---|---|
| 1,516,838 | Arnold | Nov. 25, 1924 |
| 2,780,503 | Herr | Feb. 5, 1957 |
| 2,873,152 | Thompson | Feb. 10, 1959 |

FOREIGN PATENTS

| | | |
|---|---|---|
| 243,344 | Great Britain | Apr. 29, 1926 |
| 1,069,437 | Germany | Nov. 19, 1959 |